United States Patent
Xu et al.

(10) Patent No.: US 8,710,758 B2
(45) Date of Patent: Apr. 29, 2014

(54) DIMMER SYSTEM AND DAMPER CIRCUIT THEREOF

(75) Inventors: Li-Zhi Xu, Shanghai (CN); Wei-Qiang Zhang, Shanghai (CN); Qi Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 227 days.

(21) Appl. No.: 13/239,399

(22) Filed: Sep. 22, 2011

(65) Prior Publication Data

US 2012/0319608 A1     Dec. 20, 2012

(30) Foreign Application Priority Data

Jun. 16, 2011   (CN) .......................... 2011 1 0162585

(51) Int. Cl.
*H05B 37/02* (2006.01)

(52) U.S. Cl.
USPC ............................. 315/224; 315/208; 315/226

(58) Field of Classification Search
USPC ........... 315/200 R, 208, 209 R, 224–226, 291
See application file for complete search history.

(56) References Cited

U.S. PATENT DOCUMENTS

| | | | | |
|---|---|---|---|---|
| 4,945,289 A * | 7/1990 | Harel | ............................ | 315/226 |
| 6,020,689 A * | 2/2000 | Gradzki et al. | ............... | 315/224 |
| 7,928,668 B2 | 4/2011 | Huang et al. | | |
| 8,487,552 B2 * | 7/2013 | Watanabe et al. | ............. | 315/307 |
| 2009/0122580 A1 * | 5/2009 | Stamm et al. | .................... | 363/44 |
| 2010/0134038 A1 * | 6/2010 | Shackle et al. | ................. | 315/291 |
| 2010/0225239 A1 * | 9/2010 | King | ............................. | 315/224 |

FOREIGN PATENT DOCUMENTS

| | | |
|---|---|---|
| CN | 1360750 A | 7/2002 |
| CN | 102014546 A | 4/2011 |
| TW | 523738 B | 3/2003 |
| TW | 200945720 A | 11/2009 |

* cited by examiner

*Primary Examiner* — Tung X Le
(74) *Attorney, Agent, or Firm* — CKC & Partners Co., Ltd.

(57) ABSTRACT

A damper circuit is operable to dampen resonance of an electromagnetic interference filter when a phase dimmer activates. The damper circuit includes a capacitor and a bipolar junction transistor (BJT). The capacitor includes a first terminal and a second terminal. The BJT includes a control terminal, a collector terminal, and an emitter terminal. The control terminal of the BJT receives a control signal to make the BJT operate in the amplified area, and the collector terminal of the BJT is electrically connected to the second terminal of the capacitor. The first terminal of the capacitor receives the resonance generated to by the electromagnetic interference filter, and the BJT and the capacitor cooperate to dampen the resonance generated by the electromagnetic interference filter when the BJT operates in the amplified area.

22 Claims, 3 Drawing Sheets

DIMMER SYSTEM AND DAMPER CIRCUIT THEREOF

RELATED APPLICATIONS

This application claims priority to Chinese Application Serial Number 201110162585.3, filed Jun. 16, 2011, which is herein incorporated by reference.

BACKGROUND

1. Field of Invention

The embodiment of the present invention relates generally to a circuit structure and, more particularly, to a damper circuit.

2. Description of Related Art

Recently, the compact fluorescent lamp (CFL) and the light emitting is diode (LED) are increasingly being used in lighting applications due to their higher energy efficiency and longer life than the incandescent lamp.

As is well known, a phase cut dimmer is often used with an incandescent lamp to realize a dimming function. However, a normal lamp driver can not operate correctly with a phase cut dimmer. If a normal lamp driver is connected to a phase cut dimmer, the lamp will flicker.

In order to replace an incandescent lamp with a CFL or LED in a phase cut dimming system, this problem should be solved. The reason for this problem is that a TRIAC (triode for alternating current) in a phase cut dimmer requires a minimum holding current to maintain in a conductive state after it is triggered, but the resonance of an electromagnetic interference filter in a normal lamp driver at the rising edge of an input voltage will make the current through the TRIAC lower than the required holding current value, causing the lamp to flicker.

In order to solve the above problems, those skilled in the art are striving to find a solution, but no applicable method has yet been put forward. Therefore, there is a need to improve the resonance of electromagnetic interference filters resulting in a flicker of a lamp due to a change of the current through a triode for alternating current switch when the phase dimmer activates.

SUMMARY

A damper circuit is provided so as to improve the resonance of an electromagnetic interference filter resulting in a flicker of a lamp due to a change of the current through a triode for alternating current switch when a phase dimmer activates.

Thus, one aspect of the embodiment of the present invention is to provide a damper circuit. The damper circuit is operable to dampen the resonance of an electromagnetic interference filter when a phase dimmer activates. The damper circuit comprises a capacitor and a bipolar junction transistor. The capacitor comprises a first terminal and a second terminal. The bipolar junction transistor comprises a control terminal, a collector terminal, and an emitter terminal. The bipolar junction transistor is operable to receive a control signal through the control terminal thereof to operate in amplified area, and the collector terminal of the bipolar junction transistor is electrically connected to the second terminal of the capacitor.

The first terminal of the capacitor is operable to receive the resonance generated by the electromagnetic interference filter, and the bipolar junction transistor and the capacitor operate together to dampen the resonance generated by the electromagnetic interference filter when the bipolar junction transistor operates in the amplified area.

In one embodiment of the present invention, the damper circuit further comprises a diode. The diode is connected between the collector terminal and the emitter terminal of the bipolar junction transistor in the reverse direction.

In another embodiment of the present invention, the damper circuit further comprises a resistor. The resistor comprises a first terminal and a second terminal. The first terminal of the resistor is electrically connected to the second terminal of the capacitor, and the second terminal of the resistor is electrically connected to the control terminal of the bipolar junction transistor.

In yet another embodiment of the present invention, the damper circuit further comprises a power switch. The power switch comprises a control terminal, a first terminal, and a second terminal. The first terminal of the power switch is electrically connected to the second terminal of the resistor, the second terminal of the power switch is electrically connected to the control terminal of the bipolar junction transistor, and the control terminal of the power switch is operable to receive the control signal so as to make the bipolar junction transistor operate in the amplified area.

In another aspect, the embodiment of the present invention provides a damper circuit. The damper circuit is operable to dampen resonance generated by an electromagnetic interference filter when a phase dimmer activates. The damper circuit comprises a capacitor and a bipolar junction transistor. The capacitor comprises a first terminal and a second terminal. The bipolar junction in transistor comprises a control terminal, a collector terminal, and an emitter terminal. The bipolar junction transistor is operable to receive a control signal through the control terminal thereof to operable in the amplified area, and the emitter terminal of the bipolar junction transistor is electrically connected to the second terminal of the capacitor.

The first terminal of the capacitor is operable to receive the resonance generated by the electromagnetic interference filter, and the bipolar junction transistor and the capacitor operate together to dampen the resonance generated by the electromagnetic interference filter when the bipolar junction transistor operates in the amplified area.

In one embodiment of the present invention, the damper circuit further comprises a diode. The diode is connected between the collector terminal and the emitter terminal of the bipolar junction transistor in the reverse direction.

In another embodiment of the present invention, the damper circuit further comprises a resistor. The resistor comprises a first terminal and a second terminal. The first terminal of the resistor is electrically connected to the control terminal of the bipolar junction transistor.

In yet another embodiment of the present invention, the damper circuit further comprises a power switch. The power switch comprises a control terminal, a first terminal, and a second terminal. The first terminal of the power switch is electrically connected to the second terminal of the resistor, and the control terminal of the power switch is operable to receive the control signal so as to make the bipolar junction transistor operate in the amplified area.

In yet another aspect, the embodiment of the present invention provides a dimming system. The dimming system comprises a phase dimmer, an electromagnetic interference filter, a converter, a damper circuit, and a power converter. The phase dimmer is operable to regulate a phase of an alternating is current voltage to generate a modulated alternating current voltage.

Moreover, the electromagnetic interference filter is electrically connected to the phase dimmer for filtering the electromagnetic interference signal generated by the phase dimmer. The converter is electrically connected to the electromagnetic interference filter for transforming the modulated alternating current voltage into a modulated direct current voltage. The damper circuit is electrically connected to the converter for dampening resonance generated by the electromagnetic interference filter when the phase dimmer activates. The power converter is electrically connected to the damper circuit for transforming the modulated direct current voltage.

In one embodiment of the present invention, the damper circuit comprises a capacitor and a bipolar junction transistor. The capacitor comprises a first terminal and a second terminal. The bipolar junction transistor comprises a control terminal, a collector terminal, and an emitter terminal. The bipolar junction transistor is operable to receive a control signal through the control terminal thereof to operate in the amplified area, and the collector terminal of the bipolar junction transistor is electrically connected to the second terminal of the capacitor.

The first terminal of the capacitor is operable to receive the resonance generated by the electromagnetic interference filter, and the bipolar junction transistor and the capacitor operate together to dampen the resonance generated by the electromagnetic interference filter when the bipolar junction transistor operates in the amplified area.

In another embodiment of the present invention, the damper circuit comprises a diode. The diode is connected between the collector terminal and the emitter terminal of the bipolar junction transistor in the reverse direction.

In yet another embodiment of the present invention, the damper circuit further comprises a resistor. The resistor comprises a first terminal and a second terminal. The first terminal of the resistor is electrically connected to the second terminal of the capacitor, and the second terminal of the resistor is electrically connected to the control terminal of the bipolar junction transistor.

In still another embodiment of the present invention, the damper circuit further comprises a power switch. The power switch comprises a control terminal, a first terminal, and a second terminal. The first terminal of the power switch is electrically connected to the second terminal of the first resistor, the second terminal of the power switch is electrically connected to the control terminal of the bipolar junction transistor, and the control terminal of the power switch is operable to receive the control signal so as to make the bipolar junction transistor operate in the amplified area.

In yet another embodiment of the present invention, the power switch comprises a bipolar junction transistor.

In still another embodiment of the present invention, the damper circuit comprises a capacitor and a bipolar junction transistor. The capacitor comprises a first terminal and a second terminal. The bipolar junction transistor comprises a control terminal, a collector terminal, and an emitter terminal. The bipolar junction transistor is operable to receive a control signal through the control terminal thereof to operate in the amplified area, and the emitter terminal of the bipolar junction transistor is electrically connected to the second terminal of the capacitor.

The first terminal of the capacitor is operable to receive the resonance generated by the electromagnetic interference filter, and the bipolar junction transistor and the capacitor operate together to dampen the resonance generated by the electromagnetic interference filter when the bipolar junction transistor operates in the amplified area.

In yet another embodiment of the present invention, the damper circuit further comprises a diode. The diode is connected between the collector terminal and the emitter terminal of the bipolar junction transistor in the reverse direction.

In still another embodiment of the present invention, the damper circuit further comprises a resistor. The resistor comprises a first terminal and a to second terminal. The first terminal of the resistor is electrically connected to the control terminal of the bipolar junction transistor.

In still another embodiment of the present invention, the damper circuit further comprises a power switch. The power switch comprises a control terminal, a first terminal, and a second terminal. The first terminal of the power switch is electrically connected to the second terminal of the resistor, and the control terminal of the power switch is operable to receive the control signal so as to make the bipolar junction transistor operate in the amplified area.

In still another embodiment of the present invention, the power switch comprises a bipolar junction transistor.

In still another embodiment of the present invention, the phase dimmer comprises a triode for alternating current switch, a diode for alternating current switch, a variable resistor, a resistor, and a capacitor. The diode for alternating current switch is electrically connected to the triode for alternating current switch. The variable resistor is electrically connected to the diode for alternating current switch. The resistor is connected with the variable resistor in series. The capacitor is electrically connected to the triode for alternating current switch, the diode for alternating current switch, and the variable resistor.

In yet another embodiment of the present invention, the converter comprises a rectifier and a filter. The rectifier is electrically connected to the electromagnetic interference filter for generating the modulated direct current voltage by rectifying the modulated alternating current voltage. The filter is electrically connected to the rectifier for filtering the modulated direct current voltage.

In summary, the damper circuit is provided so as to improve the resonance of the electromagnetic interference filter resulting in a flicker of a lamp due to a change of the current through a triode for alternating current switch when the phase dimmer activates.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
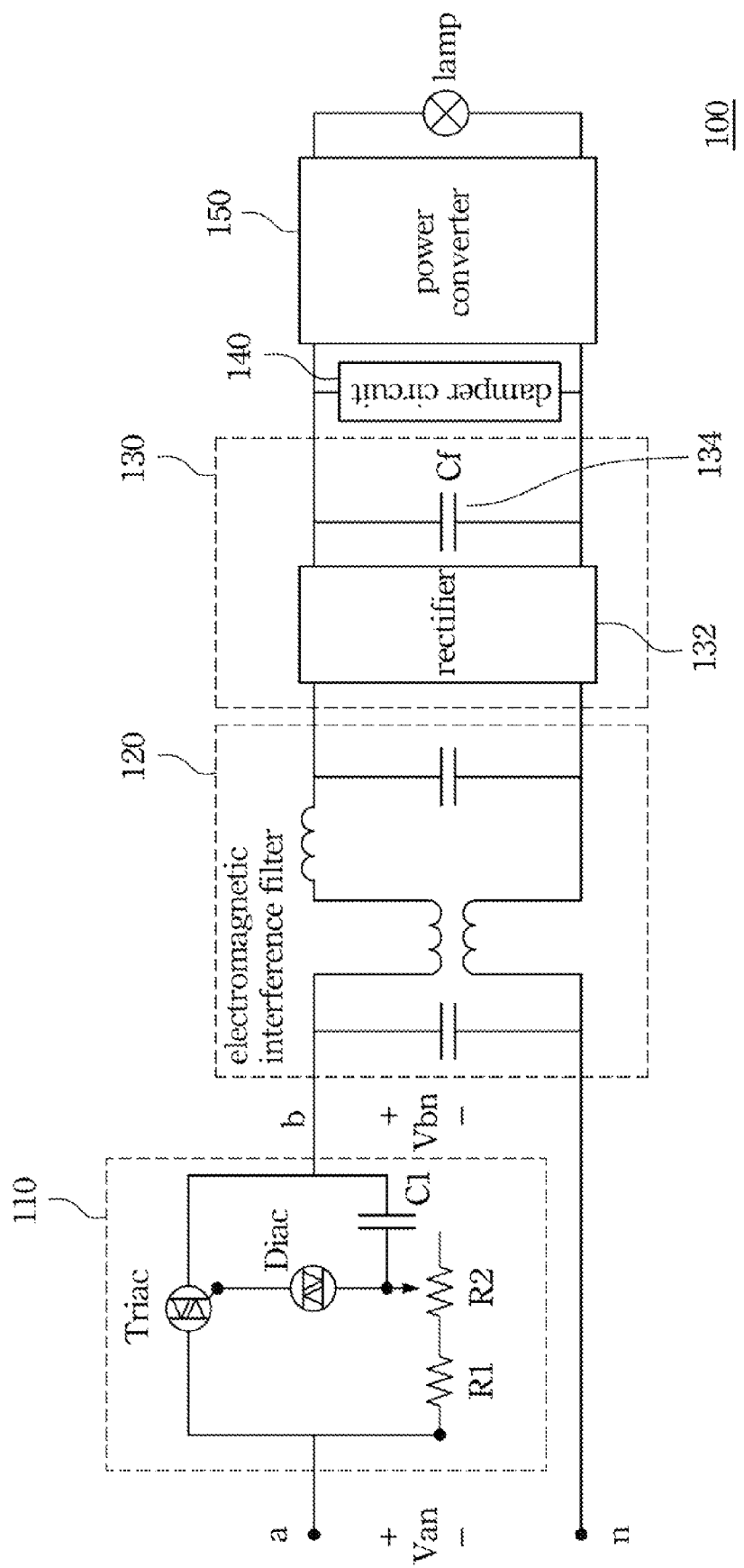
FIG. 1 shows schematically a circuit diagram of a dimming system according to one embodiment of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated.

As used herein, the terms "comprising," "including," "having," "containing," "involving," and the like are to be understood to be open-ended, i.e., to mean including but not limited to.

FIG. 1 shows schematically a circuit diagram of a dimming system 100 according to one embodiment of the present invention. As shown in FIG. 1, the dimming system 100 comprises a phase dimmer 110, an electromagnetic interference filter 120, a converter 130, a damper circuit 140, and a power converter 150.

The phase dimmer 110 is operable to regulate the phase of an alternating current voltage Van to generate a modulated alternating current voltage Vbn. The electromagnetic interference filter 120 is electrically connected to the phase dimmer 110 for filtering the electromagnetic interference signal generated by the phase dimmer 110. The converter 130 is electrically connected to the electromagnetic interference filter 120 for transforming the modulated alternating current voltage Vbn into a modulated direct current voltage. The damper circuit 140 is electrically connected to the converter 130 for dampening resonance generated by the electromagnetic interference filter 120 when the phase dimmer 110 activates. The power converter 150 is electrically connected to the damper circuit 140 for transforming the modulated direct current voltage and providing a resulting voltage to a lamp.

The phase dimmer 110 comprises a triode for alternating current (TRIAC) switch, a diode for alternating current (DIAC) switch, a variable resistor R2, a resistor R1, and a capacitor C1. The diode for alternating current switch is electrically connected to the triode for alternating current switch. The variable resistor R2 is electrically connected to the diode for alternating current switch. The resistor R1 is connected with the variable resistor R2 in series. The capacitor C1 is electrically connected to the triode for alternating current switch, the diode for alternating current switch, and the variable resistor R2.

Furthermore, the converter 130 comprises a rectifier 132 and a filter 134 (for example, a filter capacitor Cf). The rectifier 132 is electrically connected to the electromagnetic interference filter 120 for generating the modulated direct current voltage by rectifying the modulated alternating current voltage Vbn. The filter 134 is electrically connected to the rectifier 132 for filtering the modulated direct current voltage.

Figure 2A:
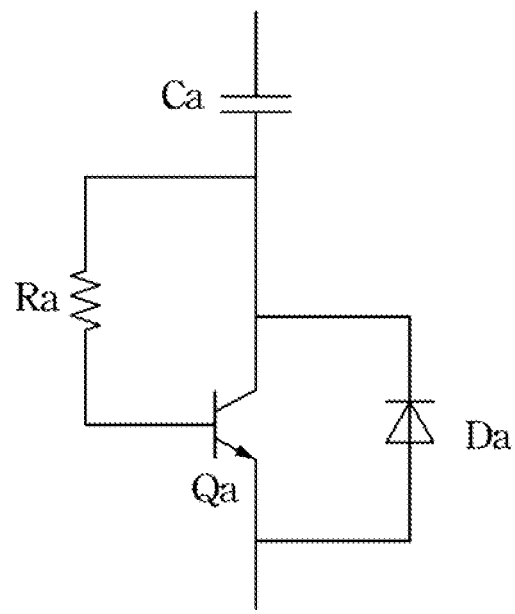
FIG. 2A shows schematically a circuit diagram of a damper circuit according to embodiments of the present invention, in which the damper circuit may be used in the dimming system of FIG. 1.

FIG. 2A shows schematically a circuit diagram of a damper circuit 140 according to embodiments of the present invention, in which the damper circuit 140 may be used in the dimming system 100 of FIG. 1.

As shown in FIG. 2A, the damper circuit 140 is operable to dampen resonance generated by the electromagnetic interference filter 120 when the phase dimmer 110 as shown in FIG. 1 activates. The damper circuit 140 comprises a capacitor Ca and a bipolar junction transistor (BJT) Qa. The capacitor Ca comprises a first terminal and a second terminal. The bipolar junction transistor Qa comprises a control terminal, a collector terminal, and an emitter terminal. The bipolar junction transistor Qa is operable to receive a control signal through the control terminal thereof to operate in the amplified area, and the collector terminal of the bipolar junction transistor Qa is electrically connected to the second terminal of the capacitor Ca.

It is noted that the control signal can be generated by the circuit disposition of the damper circuit 140 or by a physical element. As long as the control signal can make the bipolar junction transistor Qa operate in the amplified area, the various different ways in which the control signals can be generated fall within the scope of the present invention.

The first terminal of the capacitor Ca is operable to receive the resonance generated by the electromagnetic interference filter 120 shown in FIG. 1, and the bipolar junction transistor Qa and the capacitor Ca operate together to dampen the resonance generated by the electromagnetic interference filter 120 when the bipolar junction transistor Qa operates in the amplified area.

Specifically, the bipolar junction transistor Qa is equivalent to a resistor when the bipolar junction transistor Qa operates in the amplified area, and the serial capacitor (the capacitor Ca)-resistor (the equivalent resistor when the is bipolar junction transistor Qa operates in the amplified area) circuit dampens the resonance generated by the electromagnetic interference filter 120 to restrain the resonance. Hence, the value of the current flowing through the triode for alternating current switch as shown in FIG. 1 can be kept above the holding current value so that the triode for alternating current switch is kept triggered, thereby preventing the lamp from flickering.

In one embodiment, the damper circuit 140 further comprises a diode Da. The diode Da is connected between the collector terminal and the emitter terminal of the bipolar junction transistor Qa in the reverse direction. Moreover, the damper circuit 140 further comprises a resistor Ra. The resistor Ra comprises a first terminal and a second terminal. The first terminal of the resistor Ra is electrically connected to the second terminal of the capacitor Ca, and the second terminal of the resistor Ra is electrically connected to the control terminal of the bipolar junction transistor Qa. As a result, the current flows through the diode Da and not through the resistor Ra when the capacitor Ca discharges so that power consumption is low and the efficiency of the damper circuit 140 is high.

Figure 2B:
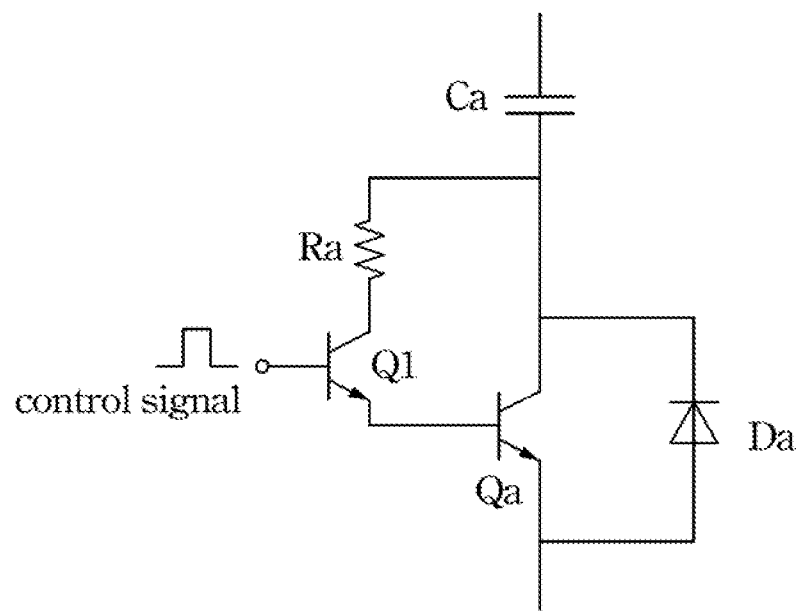
FIG. 2B shows schematically a circuit diagram of a damper circuit according to embodiments of the present invention, in which the damper circuit may be used in the dimming system of FIG. 1.

FIG. 2B shows schematically a circuit diagram of a damper circuit 140 according to embodiments of the present invention, in which the damper circuit 140 may be used in the dimming system 100 of FIG. 1.

Compared with the damper circuit 140 shown in FIG. 2A, the damper circuit 140 of FIG. 2B further comprises a power switch Q1. The power switch Q1 comprises a control terminal, a first terminal, and a second terminal. The first terminal of the power switch Q1 is electrically connected to the second terminal of the resistor Ra, the second terminal of the power switch Q1 is electrically connected to the control terminal of the bipolar junction transistor Qa, and the control terminal of the power switch Q1 is operable to receive the control signal so as to make the bipolar junction transistor Qa operate in the amplified area. Therefore, the switch of the damper circuit 140 can be controlled according to whether the power switch Q1 is conducting or not.

In an optional embodiment, the power switch Q1 comprises a bipolar junction transistor.

Figure 3A:
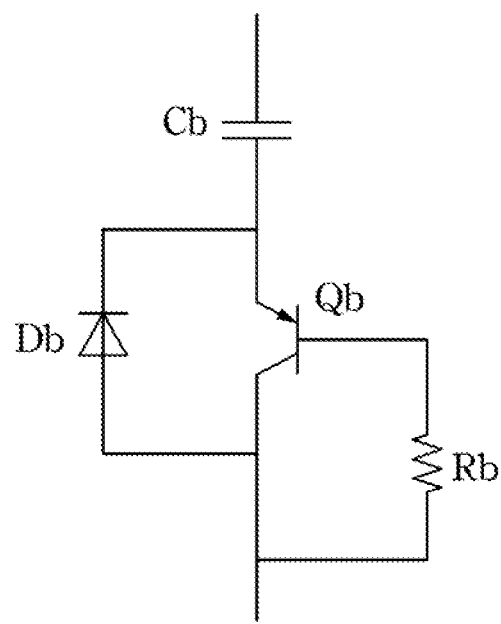
FIG. 3A shows schematically a circuit diagram of a damper circuit according to embodiments of the present invention, in which the damper circuit may be used in the dimming system of FIG. 1.

FIG. 3A shows schematically a circuit diagram of a damper circuit 140 according to embodiments of the present invention, in which the damper circuit 140 may be used in the dimming system 100 of FIG. 1.

As shown in FIG. 3A, the damper circuit 140 is operable to dampen the resonance generated by the electromagnetic interference filter 120 when the phase dimmer 110 shown in FIG. 1 activates. The damper circuit 140 comprises a capacitor Cb and a bipolar junction transistor Qb. The capacitor Cb comprises a first terminal and a second terminal. The bipolar junction transistor Qb comprises a control terminal, a collector terminal, and an emitter terminal. The bipolar junction transistor Qb is operable to receive a control signal through the control terminal thereof to operate in the amplified area, and the emitter terminal of the bipolar junction transistor Qb is electrically connected to the second terminal of the capacitor Cb.

It is noted that the control signal can be generated by the circuit disposition of the damper circuit 140 or by a physical element. As long as the control signal can make the bipolar junction transistor Qa operate in the amplified area, the various different ways in which the control signal can be generated fall within the scope of the present invention.

The first terminal of the capacitor Cb is operable to receive the resonance generated by the electromagnetic interference filter 120 shown in FIG. 1, and the bipolar junction transistor Qb and the capacitor Cb operate together to dampen the resonance generated by the electromagnetic interference filter 120 when the bipolar junction transistor Qb operates in the amplified area.

Specifically, the bipolar junction transistor Qb is equivalent to a resistor when the bipolar junction transistor Qb operates in the amplified area, and the serial capacitor (the capacitor Cb)-resistor (the equivalent resistor when the bipolar junction transistor Qb operates in the amplified area) circuit dampens the resonance generated by the electromagnetic interference filter 120 to restrain the resonance. Hence, the value of the current flowing through the triode for alternating current switch shown in FIG. 1 can be kept above the holding current value so that the triode for alternating current switch is kept triggered, thereby preventing the lamp from flickering.

In one embodiment, the damper circuit 140 further comprises a diode Db. The diode Db is connected between the collector terminal and the emitter terminal of the bipolar junction transistor Qb in the reverse direction. Moreover, the damper circuit 140 further comprises a resistor Rb. The resistor Rb comprises a first terminal and a second terminal. The first terminal of the resistor Rb is electrically connected to the control terminal of the bipolar junction transistor Qb. As a result of such a configuration, the current flows through the diode Db and not through the resistor Rb when the capacitor Cb discharges so that power consumption is low and the efficiency of the damper circuit 140 is high.

Figure 3B:
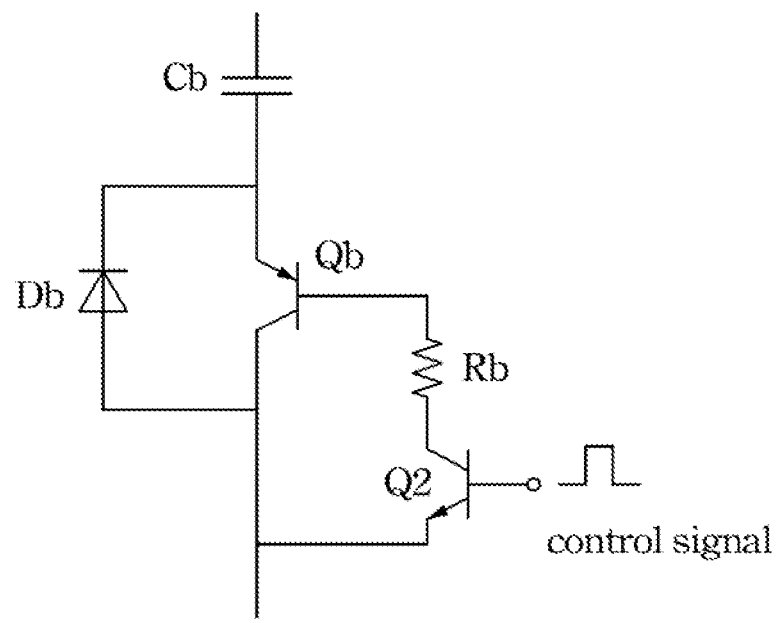
FIG. 3B shows schematically a circuit diagram of a damper circuit according to embodiments of the present invention, in which the damper circuit may be used in the dimming system of FIG. 1.

FIG. 3B shows schematically a circuit diagram of a damper circuit 140 according to embodiments of the present invention, in which the damper circuit 140 may be used in the dimming system 100 of FIG. 1.

Compared with the damper circuit 140 shown in FIG. 3A, the damper circuit 140 of FIG. 3B further comprises a power switch Q2. The power switch Q2 comprises a control terminal, a first terminal, and a second terminal. The first terminal of the power switch Q2 is electrically connected to the second terminal of the resistor Rb, and the control terminal of the power switch Q2 is operable to receive the control signal so as to make the bipolar junction transistor Qb operate in the amplified area. Therefore, the switch of the damper circuit 140 can be controlled according to whether the power switch Q1 is conducting or not.

In an optional embodiment, the power switch Q2 comprises a bipolar junction transistor.

In view of the foregoing embodiments of the present invention, many advantages of the present invention are now apparent. The embodiments of the present invention provide a damper circuit. The bipolar junction transistor Qa or the bipolar junction transistor Qb is equivalent to a resistor when the bipolar junction transistor Qa or the bipolar junction transistor Qb of the damper circuit of the embodiments of the present invention operates in the amplified area, and the serial capacitor-resistor circuit dampens the resonance generated by the electromagnetic interference filter to restrain the resonance. Therefore, the value of the current flowing through the triode for alternating current switch can be kept above the holding current value so as to prevent the lamp from flickering.

In addition, the current flows through the diode Da or the diode Db not through the resistor Ra or resistor Rb when the capacitor Ca or capacitor Cb discharges so that power consumption is low and the efficiency of the damper circuit is high. Furthermore, the control terminal of the power switch Q1 or the power switch Q2 is operable to receive the control signal so as to make the bipolar junction transistor Qa or the bipolar junction transistor Qb operate in the amplified area. Therefore, the switch of the damper circuit can be controlled according to whether the power switch Q1 or the power switch Q2 is conducted or not.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A damper circuit for dampening resonance generated by an electromagnetic interference filter when a phase dimmer activates, the damper circuit comprising:
   a capacitor comprising a first terminal and a second terminal; and
   a bipolar junction transistor comprising a control terminal, a collector terminal, and an emitter terminal, wherein the bipolar junction transistor is operable to receive a control signal through the control terminal thereof to operate in the amplified area, and the collector terminal of the bipolar junction transistor is electrically connected to the second terminal of the capacitor, wherein the first terminal of the capacitor is operable to receive the resonance generated by the electromagnetic interference filter, and the bipolar junction transistor and the capacitor operate together to dampen the resonance generated by the electromagnetic interference filter when the bipolar junction transistor operates in the amplified area.

2. The damper circuit according to claim 1, wherein the damper circuit further comprises:
a diode connected between the collector terminal and the emitter terminal of the bipolar junction transistor in the reverse direction.

3. The damper circuit according to claim 2, wherein the damper circuit further comprises:
a power switch comprising a control terminal, a first terminal, and a second terminal, wherein the first terminal of the power switch is electrically connected to the second terminal of the resistor, the second terminal of the power switch is electrically connected to the control terminal of the bipolar junction transistor, and the control terminal of the power switch is operable to receive the control signal so as to make the bipolar junction transistor operate in the amplified area.

4. The damper circuit according to claim 1, wherein the damper circuit further comprises:
a resistor comprising a first terminal and a second terminal, wherein the first terminal of the resistor is electrically connected to the second terminal of the capacitor, and the second terminal of the resistor is electrically connected to the control terminal of the bipolar junction transistor.

5. A damper circuit for dampening resonance generated by an electromagnetic interference filter when a phase dimmer activates, the damper circuit comprising:
a capacitor comprising a first terminal and a second terminal; and
a bipolar junction transistor comprising a control terminal, a collector terminal, and an emitter terminal, wherein the bipolar junction transistor is operable to receive a control signal through the control terminal thereof to operate in the amplified area, and the emitter terminal of the bipolar junction transistor is electrically connected to the second terminal of the capacitor,
wherein the first terminal of the capacitor is operable to receive the resonance generated by the electromagnetic interference filter, and the bipolar junction transistor and the capacitor operate together to dampen the resonance generated by the electromagnetic interference filter when the bipolar junction transistor operates in the amplified area.

6. The damper circuit according to claim 5, wherein the damper circuit further comprises:
a diode connected between the collector terminal and the emitter terminal of the bipolar junction transistor in the reverse direction.

7. The damper circuit according to claim 5, wherein the damper circuit further comprises:
a resistor comprising a first terminal and a second terminal, wherein the first terminal of the resistor is electrically connected to the control terminal of the bipolar junction transistor.

8. The damper circuit according to claim 6, wherein the damper circuit further comprises:
a power switch comprising a control terminal, a first terminal and a second terminal, wherein the first terminal of the power switch is electrically connected to the second terminal of the resistor, and the control terminal of the power switch is operable to receive the control signal so as to make the bipolar junction transistor operate in the amplified area.

9. A dimming system, comprising:
a phase dimmer for regulating a phase of an alternating current voltage to generate a modulated alternating current voltage;
an electromagnetic interference filter electrically connected to the phase dimmer for filtering the electromagnetic interference signal generated by the phase dimmer;
a converter electrically connected to the electromagnetic interference filter for transforming the modulated alternating current voltage into a modulated direct current voltage;
a damper circuit electrically connected to the converter for dampening resonance generated by the electromagnetic interference filter when the phase dimmer activates; and
a power converter electrically connected to the damper circuit for transforming the modulated direct current voltage;
wherein the damper circuit comprises:
a capacitor comprising a first terminal and a second terminal; and
a bipolar junction transistor comprising a control terminal, a collector terminal, and an emitter terminal, wherein the bipolar junction transistor is operable to receive a control signal through the control terminal thereof to operate in the amplified area, and the collector terminal of the bipolar junction transistor is electrically connected to the second terminal of the capacitor;
wherein the first terminal of the capacitor is operable to receive the resonance generated by the electromagnetic interference filter, and the bipolar junction transistor and the capacitor operate together to dampen the resonance generated by the electromagnetic interference filter when the bipolar junction transistor operates in the amplified area.

10. The dimming system according to claim 9, wherein the damper circuit further comprises:
a diode connected between the collector terminal and the emitter terminal of the bipolar junction transistor in the reverse direction.

11. The dimming system according to claim 10, wherein the damper circuit further comprises:
a resistor comprising a first terminal and a second terminal, wherein the first terminal of the resistor is electrically connected to the second terminal of the capacitor, and the second terminal of the resistor is electrically connected to the control terminal of the bipolar junction transistor.

12. The dimming system according to claim 11, wherein the damper circuit further comprises:
a power switch comprising a control terminal, a first terminal, and a second terminal, wherein the first terminal of the power switch is electrically connected to the second terminal of the first resistor, the second terminal of the power switch is electrically connected to the control terminal of the bipolar junction transistor, and the control terminal of the power switch is operable to receive the control signal so as to make the bipolar junction transistor operate in the amplified area.

13. The dimming system according to claim 12, wherein the power switch comprises a bipolar junction transistor.

14. The dimming system according to claim 9, wherein the phase dimmer comprises:
   a triode for alternating current switch;
   a diode for alternating current switch electrically connected to the triode for alternating current switch;
   a variable resistor electrically connected to the diode for alternating current switch;
   a resistor connected with the variable resistor in series; and
   a capacitor electrically connected to the triode for alternating current switch, the diode for alternating current switch, and the variable resistor.

15. The dimming system according to claim 9, wherein the converter comprises:
   a rectifier electrically connected to the electromagnetic interference filter for generating the modulated direct current voltage by rectifying the modulated alternating current voltage; and
   a filter electrically connected to the rectifier for filtering the modulated direct current voltage.

16. A dimming system, comprising:
   a phase dimmer for regulating a phase of an alternating current voltage to generate a modulated alternating current voltage;
   an electromagnetic interference filter electrically connected to the phase dimmer for filtering the electromagnetic interference signal generated by the phase dimmer;
   a converter electrically connected to the electromagnetic interference filter for transforming the modulated alternating current voltage into a modulated direct current voltage;
   a damper circuit electrically connected to the converter for dampening resonance generated by the electromagnetic interference filter when the phase dimmer activates; and
   a power converter electrically connected to the damper circuit for transforming the modulated direct current voltage;
   wherein the damper circuit comprises:
      a capacitor comprising a first terminal and a second terminal; and
      a bipolar junction transistor comprising a control terminal, a collector terminal and an emitter terminal, wherein the bipolar junction transistor is operable to receive a control signal through the control terminal thereof to operate in the amplified area, and the emitter terminal of the bipolar junction transistor is electrically connected to the second terminal of the capacitor;
   wherein the first terminal of the capacitor is operable to receive the resonance generated by the electromagnetic interference filter, and the bipolar junction transistor and the capacitor operate together to dampen the resonance generated by the electromagnetic interference filter when the bipolar junction transistor operates in the amplified area.

17. The dimming system according to claim 16, wherein the damper circuit further comprises:
   a diode connected between the collector terminal and the emitter terminal of the bipolar junction transistor in the reverse direction.

18. The dimming system according to claim 17, wherein the damper circuit further comprises:
   a resistor comprising a first terminal and a second terminal, wherein the first terminal of the resistor is electrically connected to the control terminal of the bipolar junction transistor.

19. The dimming system according to claim 18, wherein the damper circuit further comprises:
   a power switch comprising a control terminal, a first terminal and a second terminal, wherein the first terminal of the power switch is electrically connected to the second terminal of the resistor, and the control terminal of the power switch is operable to receive the control signal so as to make the bipolar junction transistor operate in the amplified area.

20. The dimming system according to claim 19, wherein the power switch comprises a bipolar junction transistor.

21. The dimming system according to claim 16, wherein the phase dimmer comprises:
   a triode for alternating current switch;
   a diode for alternating current switch electrically connected to the triode for alternating current switch;
   a variable resistor electrically connected to the diode for alternating current switch;
   a resistor connected with the variable resistor in series; and
   a capacitor electrically connected to the triode for alternating current switch, the diode for alternating current switch, and the variable resistor.

22. The dimming system according to claim 16, wherein the converter comprises:
   a rectifier electrically connected to the electromagnetic interference filter for generating the modulated direct current voltage by rectifying the modulated alternating current voltage; and
   a filter electrically connected to the rectifier for filtering the modulated direct current voltage.

* * * * *